United States Patent [19]

Laliberté et al.

[11] Patent Number: 4,561,805
[45] Date of Patent: Dec. 31, 1985

[54] FORAGE BLOWER

[75] Inventors: Jacques Laliberté, Marianne; Gabriel Choinière, Quebec, both of Canada

[73] Assignee: B & R Choiniere, Ste-Therese, Canada

[21] Appl. No.: 515,973

[22] Filed: Jul. 21, 1983

[30] Foreign Application Priority Data

Jul. 11, 1983 [CA] Canada .................................. 432189

[51] Int. Cl.⁴ ............................................ B65G 53/48
[52] U.S. Cl. ....................................................... 406/71
[58] Field of Search ............................. 406/53, 56–59, 406/71, 80, 100–104

[56] References Cited

U.S. PATENT DOCUMENTS

| 671,161 | 4/1901 | Day ........................................ 406/58 |
| 715,349 | 12/1902 | Christie et al. ....................... 406/104 |
| 776,456 | 11/1904 | Christie et al. ....................... 406/104 |
| 3,466,095 | 9/1969 | Weihmuller ....................... 406/57 X |
| 3,968,997 | 7/1976 | Mast et al. ............................. 406/71 |

FOREIGN PATENT DOCUMENTS 2204039   8/1973   Fed. Rep. of Germany ........ 406/57

1060301   4/1954   France .................. 406/100

*Primary Examiner*—Jeffrey V. Nase
*Attorney, Agent, or Firm*—Larson & Taylor

[57] ABSTRACT

An improved forage blower having a small first stage paddle wheel type impeller or ventilator feeding a large conventionally sized second stage paddle wheel type impeller or ventilator via a short duct for transferring forage from the first stage ventilator to the second stage ventilator, the arrangement being such as to maintain the duct as short as conveniently possible to reduce loss of forage speed from the first stage ventilator to the second stage ventilator. The shafts of both ventilators are spaced apart and parallel, extending horizontally from a main power input for connection with a suitable motor such as the power take off of a farm tractor. The forage receiving hopper is preferably a rectangular hopper disposed behind the small, first stage ventilator and extending therefrom beyond the periphery of the large, second stage ventilator, and it uses an endless screw for feeding forage directly into the small, first stage ventilator thus providing a convenient arrangement for facilitating unloading of forage from a suitable carriage into the forage blower.

2 Claims, 5 Drawing Figures

FORAGE BLOWER

BACKGROUND OF THE INVENTION

This invention relates to forage blowers such as used in farming installations for loading forage into silos and other similar applications.

Forage blowers are well known in the art. They are used for loading feed material into silos directly from farm wagons, and currently, numerous manufactures produce forage blowers according to different designs. Such known designs always use a large ventilator within a cylindrical housing having a tangential spout through which blown forage is discharged, and at the end of the spout a relatively long cylindrical conduit conveys the blown forage to the top end of the silos or other forage receiving installations.

During recent years various attempts have been made in order to improve the efficiency of forage blowers in order to limit the power requirement of forage blowers, which power is normally obtained from a conventional farm tractor coupled to the blower. These various attempts however have resulted in relatively complex forge blower designs which increases the manufacturing cost thereof and the maintenance requirements. Examples of such attempts are found in the following U.S. patents:

U.S. Pat. No. 3,175,867 entitled PERIPHERAL FEED BLOWER dated Mar. 30, 1965, A. S. Fenster et al, U.S. Pat. No. 3,466,095 entitled BLOWER TYPE MATERIAL FEEDER dated Sept. 9, 1969, Water N. Weihmuller, U.S. Pat. No. 3,594,047 dated July 20, 1971, entitled FEED-MATERIAL-HANDLING APPARATUS, Richard A. Pucher, U.S. Pat. No. 3,724,908 dated Apr. 3, 1973 entitled FEED MATERIAL HANDLING APPARATUS, Burrough et al and Canadian Pat. No. 769,624 dated Oct. 17, 1967 entitled DIAGONAL FEED MATERIAL CONVEYOR AND BLOWER MECHANISM, Scarnato et al and what appears to be its counterpart U.S. Pat. No. 3,302,978 dated Feb. 7, 1967.

Other prior art patents are as follows: U.S. Pat. Nos. 3,154,349 dated Oct. 27, 1964; U.S. Pat. No. 3,175,867 Mar. 30, 1965; U.S. Pat. No. 3,271,082 Sept. 6, 1966; U.S. Pat. No. 3,306,673 Feb. 28, 1967; U.S. Pat. No. 3,328,090 June 27, 1967; U.S. Pat. No. 3,843,280 Oct. 22, 1974; U.S. Pat. No. 3,867,064 Feb. 18, 1975; U.S. Pat. No. 3,968,997 July 13, 1976 and Canadian Pat. No. 993919 July 27, 1976 and No. 993920 of the same date.

OBJECTS AND SUMMARY OF THE INVENTION

The main object of this invention is to provide a forage blower of high performance using a simple construction with minimum maintenance and which therefore can be produced at a relatively limited cost of manufacture.

In accordance with this invention an improved forage blower is provided which combines a first stage paddle wheel type impeller or ventilator and a larger conventionally sized second stage paddle wheel type impeller or ventilator whose axis of rotation is parallel to that of the first stage ventilator and whose speed of rotation is synchronized to that of the first stage ventilator, a relatively short straight duct coupling the output of the first stage ventilator with the input of the second stage ventilator such as to reduce drag in the transfer of forage from the first stage ventilator to the second stage ventilator, air inlet means affording a sufficient flow of air through the first and second stage ventilators, a conveniently located forage receiving hopper and means therefor for transferring forage from said hopper to the input of said first stage ventilator, first housing means for the first stage ventilator, second housing means for the second stage ventilator having a tangential spout of conventional design for discharging forage, and transmission means for coupling the shafts of the first stage and second stage ventilators thereby to maintain a predetermined speed relationship for the two impellers, the axes of rotation of the first stage and second stage ventilator impellers being horizontal and spaced apart a distance not substantially greater than the radius of the second stage ventilator and the first and second housing means being contiguous whereby the duct means is kept relatively short as compared with the diameter of the second stage ventilator.

With this arrangement, feed into the receiving hopper is fed by a suitable conveyor means such as an endless screw directly into the first stage ventilator which is relatively small and which therefore is able to disintegrate the material and form a stream of loose particles travelling at a suitably high speed through the duct means which feeds the larger ventilator for imparting to the particles sufficient velocity by the time they reach the tangential spout of the large ventilator housing. This results in a smooth operation with limited vibration and good output speed of the particles at the tangential spout of the large ventilator, with a surprisingly limited input power requirement. Moreover, such a forage blower can be constructed, in accordance with this invention, in a relatively simple fashion using, for example, a belt drive transmission for rotating the two parallel shafts of the impeller and the shaft of the endless screw conveying means which is also parallel to the impeller shafts but uses a safety clutch as is well known in the art.

Other and further objects and advantages of this invention will be apparent from the following specifications and depending claims taken in connection with the drawings which illustrate a preferred embodiment of the invention.

BRIEF DESCRIPTION OF THE DRAWINGS

In the accompanying drawings.

DETAILED DESCRIPTION OF THE INVENTION

Figure 1:
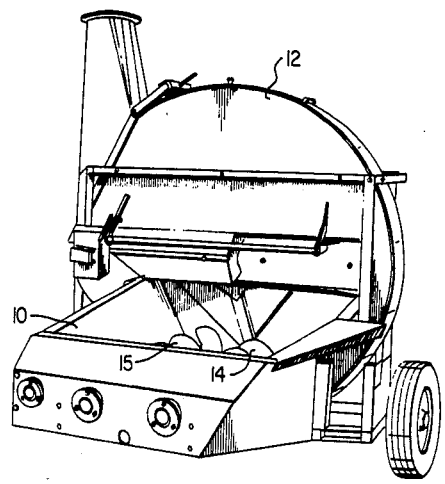
FIG. 1 is a perspective view of a forage blower constructed according to the prior art.
Figure 2:
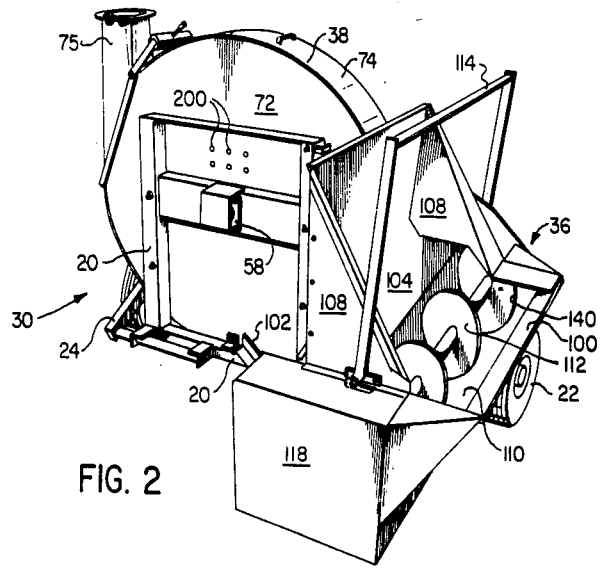
FIG. 2 is a similar perspective view of an improved forage blower constructed in accordance with the present invention.
Figure 3:
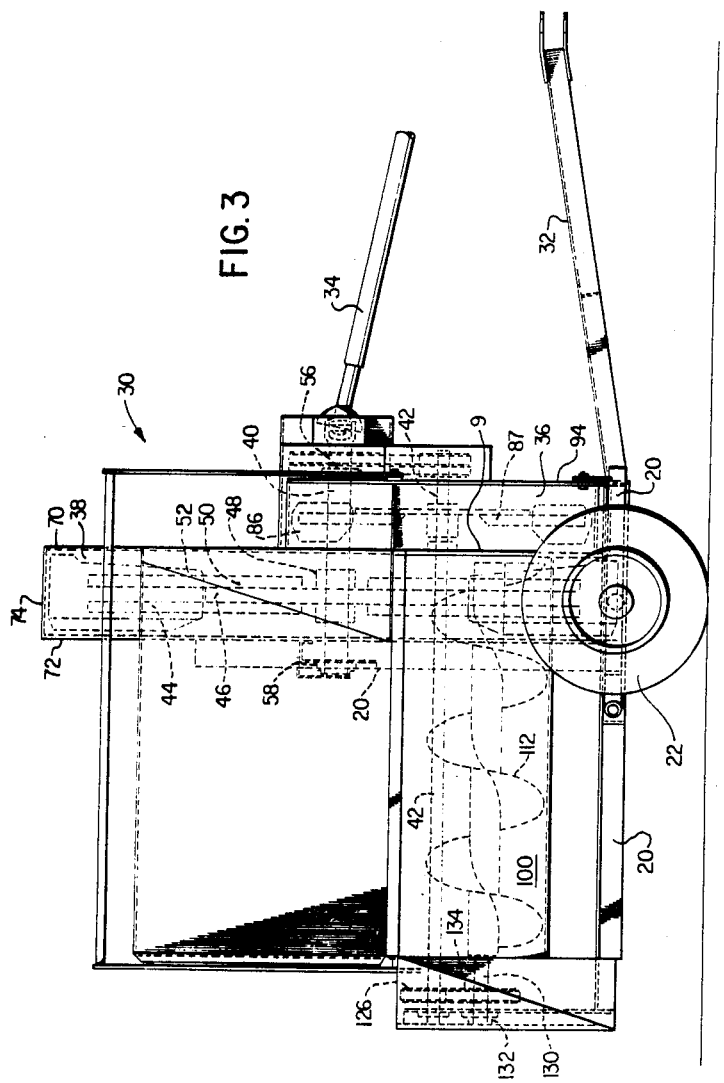
FIG. 3 is a side elevational view of the forage blower shown in FIG. 2.
Figure 4:
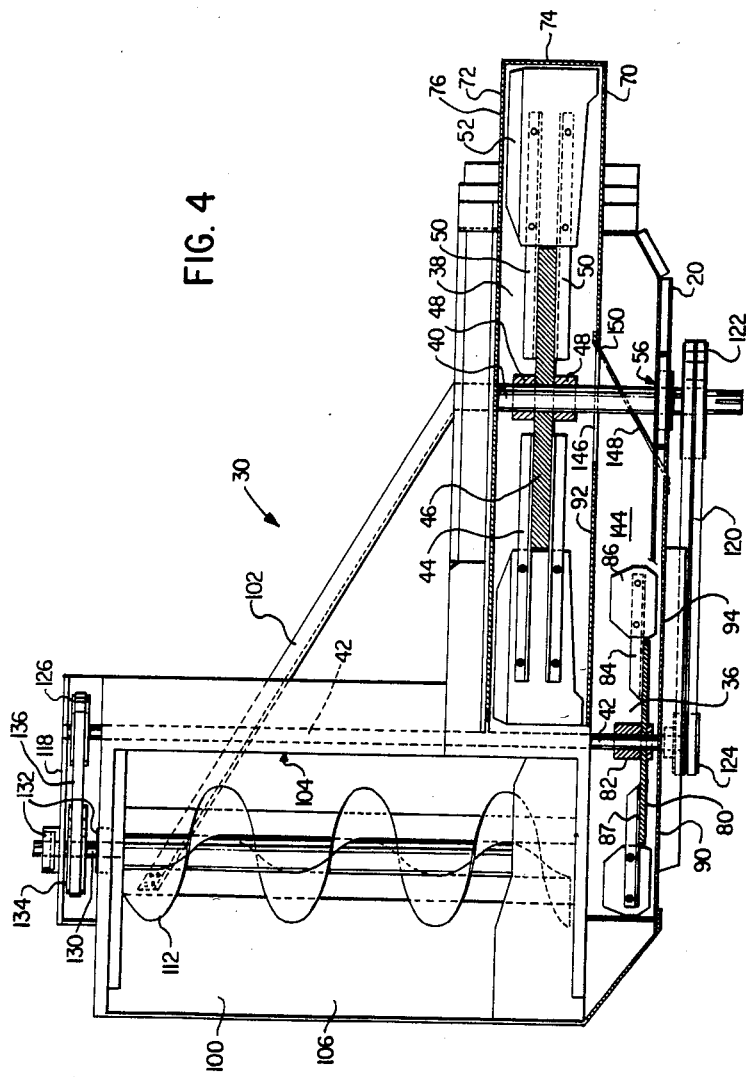
FIG. 4 is a plan view with a part in cross-section of the forage blower of FIGS. 2 and 3.

FIG. 1 shows in perspective view a conventional forage blower having a feed receiving hopper 10 feeding directly into a main paddle wheel type impeller or ventilator 12 driven into rotation by the power take-off of a suitable farm tractor or other motorized vehicle by means of a drive shaft (not shown). The feed received into hopper 10 is fed into ventilator 12 by means of endless screw conveyors 14 and 15 which are driven into rotation by a suitable transmission which includes a safety clutch as is well known in the art. This conventional forage blower, as compared with other prior forage blower designs, is of relatively simple construction but it lacks in terms of efficiency in that even with a relatively powerful motor, its maximum rate of discharge and the height of maximum delivery of the forage are relatively limited.

FIGS. 2, 3, 4 and 5 are different views of an improved forage blower constructed in accordance with this invention. The illustrated blower comprises a frame 20 supported on two wheels 22 (FIGS. 2 and 3) supporting the frame 20 by means of articulated levers 24 which allow retraction of the wheels during the forage blowing operation. In the position illustrated in FIG. 3, wheels 22 are in position for transportation of the forage blower 30 behind a tractor or similar carrier (not shown). When wheels 22 are fully retracted, frame 20 sits upon the surface of the ground, drawbar 32 remains connected to the rear of the tractor and drive shaft 34 is connected to the power take-off of the tractor (not shown).

The illustrated forage blower 30 comprises a first stage paddle wheel type impeller or ventilator 36 feeding a larger, conventionally sized second stage paddle wheel type impeller or ventilator 38 whose axis of rotation, about shaft 40 is parallel to that of the first stage ventilator 36 whose shaft is shown at 42. Shaft 40 supports a relatively large diameter paddle wheel 44 whose construction is not really critical to the invention. In the illustrated embodiment, shaft 40 supports a rotating plate 46 suitably keyed to the shaft 40 and held between bushings 48. Plate 46 supports a number of radially extending pairs of arms 50 to which paddles 52 are secured. Shaft 40 is suitably journaled to a first bearing to the front end of frame 20 and by a second bearing 58 in the rear portion of frame 20. The housing of the second stage ventilator 38 comprises a first planar wall 70, a second parallel spaced apart planar wall 72 and an arcuate peripheral wall 74 which defines a cylindrical arrangement having a tangential spout 75 for discharging forage blown by forage blower 30 into a vertically extending conduit (not shown) as is well known in the art.

The first stage ventilator 36 also comprises a rotating plate 80 keyed to shaft 42 and supported thereto by means of a suitable bushing·arrangement 82, and plate 80 supports a number of radially extending arms 84 each supporting a paddle 86 to constitute a relatively small paddle wheel 87 whose diameter is roughly equal to the radius of the large paddle wheel 44. Paddle wheel 87 is located inside a housing 90 which is contiguous to housing 76 of second stage ventilator 38. In practice, first planar wall 70 extends outwardly far enough to constitute the rearward wall 92 of housing 90 while the front wall thereof, as shown at 94, supports a peripheral wall 96 which closely surrounds paddle wheel 87 except at the output thereof as will be described further hereinafter.

Frame 20 also supports a forage receiving hopper 100 which is essentially rectangular in plan view and which forms a right angle with respect to second stage ventilator 38, and the structure is held rigidly by means of a suitable brace such as shown at 102. Hopper 100 comprises a stop wall 104 which projects upwardly a sufficient distance to cause all material being fed into the hopper to properly fall into the rectangular opening thereof as indicated at 106 in FIG. 4. Stop wall 104 is held in place by means of lateral walls 108 which further confines the material being fed into the hopper to prevent loss of material on each side.

The bottom wall of hopper 100 defines an auger as shown at 110, and an endless feed screw 112 conveys material toward first stage ventilator 36. Safety bar 114 allows manual disengagement of endless feed screw 112 by actuating a clutch mechanism (not shown) in the transmission located behind cover 118, which feature is also conventional in the art.

The speed of rotation of small paddle wheel 87 is synchronized to that of large paddle wheel 44 by means of a belt transmission 120 using a pulley 122 on shaft 40 to drive a pulley 124 on shaft 42. In practice it has been found that the speed of rotation of small paddle wheel 87 should be about equal to that of large paddle wheel 44. In a particular embodiment wherein the diameter of small paddle wheel 87 is equal to the radius of large paddle wheel 44, the speed of rotation of small paddle wheel 87 was adjusted to 510 rpm for a speed of rotation of 540 rpm for large paddle wheel 44.

Shaft 42 is provided with a rearward extension on which pulley 126 is keyed for rotating shaft 130 supporting endless feed screw in suitable bearing 132 forming a cantilever arrangement. Pulley 126 drives pulley 134 on shaft 130 by means of belt 136 which is sufficiently long to provide a proper clutch function operated through safety bar 114. The speed of rotation of feed screw 112 is not critical and should be adjusted by judicial choice of pulley sizes 126, 134 in order to obtain a smooth and sufficient rate of feed of the material through the forage blower.

Thus material fed into hopper 100 is conveyed by feed screw 112 toward first stage ventilator 36 and to this effect a circular opening 140 through first planar wall 92 (see FIG. 5) constitutes the input to first stage ventilator 36. This opening is located approximately 90 degrees upstream from the output of first stage ventilator 36 and radially inwardly of peripheral wall 90 so that material received through opening 140, i.e. the input to the first stage ventilator 36, travels a very short distance before it is expelled toward the second stage ventilator 38. To this effect, a suitable duct 144 is provided which extends essentially horizontally toward an opening 146 through first planar wall 70 which opening is located roughly 90 degrees upstream from tangential spout 75. Duct 144 is defined partially by first planar wall 70 and by a casing of constant rectangular cross-section extending from peripheral wall 96 of first stage ventilator 36 to opening 146 leading into second stage ventilator 38. A deflector plate 148 terminates duct 144 and makes an acute angle with opening 146 which it joins at the distal end thereof along a line shown at 150 in FIG. 4. Duct 144 is therefore of constant cross-section throughout most of its length except at its outlet end where it terminates by deflector plate 148 leading into second stage ventilator 38 via opening 146 in first planar wall 170. The material leaving first stage ventilator 36 has acquired some velocity which it does not have time to lose on account of the short length of duct 144 and freedom from serious obstructions therethrough, and consequently the particles reaching second stage ventilator 38 are in finally divided state and they proceed at a sufficiently high rate of speed so as to reduce the load applied to large paddle wheel 44 whose radial arms are relatively long.

In order to create a sufficient airstream, air inlet means must be provided in one or the other of planar walls 70 and 72 preferably near shaft 40 and they can take the form of a series of small apertures 200 which are not large enough to constitute a safety hazard to the operators standing nearby.

Figure 5:
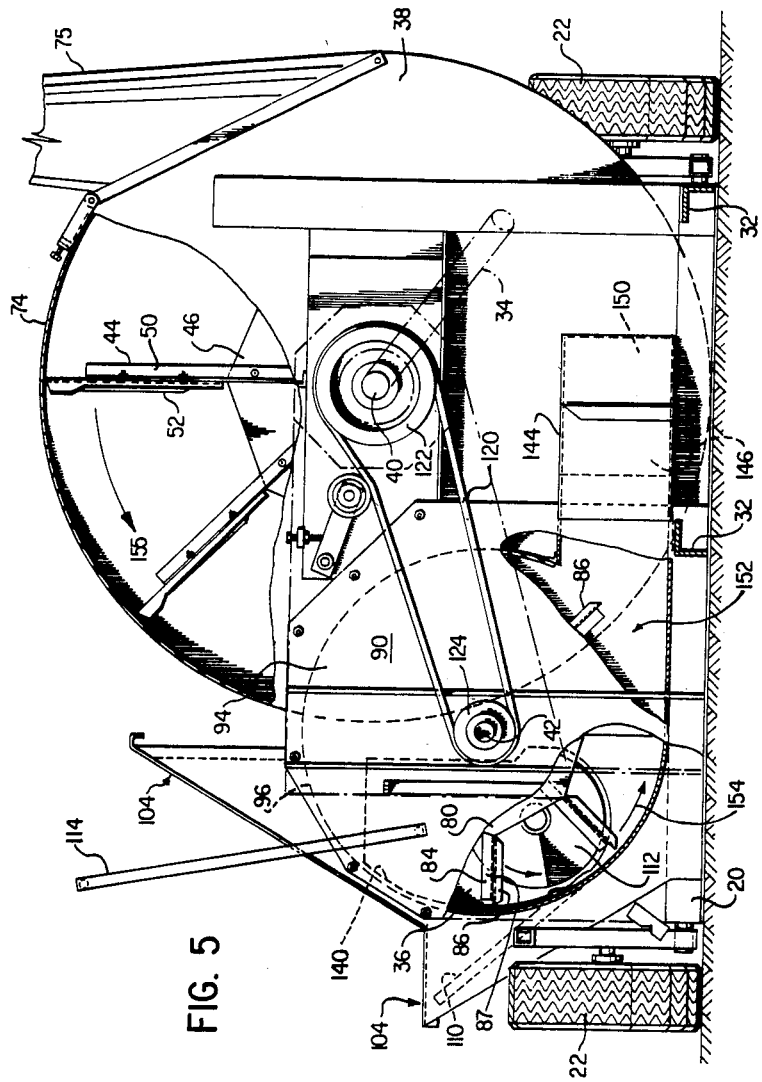
FIG. 5 is a longitudinal cross-sectional view of the forage blower according to FIGS. 2 to 4.

As better shown in FIG. 5, peripheral wall 96 is provided with a tangential output opening 152 leading directly into duct 144 with as little obstruction as possible to ensure ready exit of the material being driven by first stage ventilator 36. Thus duct means 144 constitutes an extension of the housing of first stage ventilator 36, and paddle wheels 44 and 87 rotate in the same direction as shown by arrows 154 and 155.

The general layout of forage blower 30 was found extremely convenient for use in that forage receiving hopper 100 is conveniently positioned for direct unloading of a forage carrier or wagon (not shown) and the relative arrangements of shafts 40, 42 and 130 lends itself to extremely simplified transmission means requiring minimum maintenance and ready repair.

Although a preferred embodiment of the invention is being described in detail, it should be understood that the invention is not limited to only the illustrated arrangement, the scope of the invention being defined in the appended claims. For example, hopper 100 could use a different type of material conveying means such as a vibrating mechanism, as will be obvious to those skilled in the art, without departing from the spirit of the invention.

I claim:

1. An improved forage blower comprising a frame, a first paddle wheel type impeller vertically disposed on said frame and a second paddle wheel type impeller, each impeller having a rotor with a radius and a diameter and with paddles on a rotatable shaft, and a cylindrical housing defining a chamber around the associated rotor with a lateral forage inlet and a tangential forage outlet, said first impeller being relatively small when compared with said second impeller, the shaft of the rotor of said first impeller being horizontal, the shaft of the rotor of said second impeller being horizontal and parallel to the shaft of said first impeller but spaced laterally therefrom a distance not substantially greater than the radius of the rotor of said second impeller, the working speed of rotation of said first impeller being related to that of said second impeller, said forage blower also comprising duct means serially coupling the forage outlet of the first impeller with the forage inlet of the second impeller, air inlet means affording sufficient airstream through said second impeller, a forage receiving hopper, conveying means for transferring forage from said hopper to the forage inlet of said first impeller, the housing of said second impeller having a tangential spout for discharging forage, and transmission means for rotating the shafts of said first and second impellers so as to maintain a pre-determined working speed relationship for said first and second impellers for optimum forage discharge conditions through said tangential spout, said housings of said first and second impellers being contiguous and parallel to each other, said duct means being relatively short when compared with the diameter of said second impeller and extending generally horizontally and transversally to the shaft of said second impeller, for directing forage toward said second impeller via the forage inlet thereof practically in straight line from said first impeller, said conveying means feeding forage to said first impeller via the forage inlet thereof in a first direction generally horizontal and parallel to the shaft of said first impeller across the path of travel of the paddles of said first impeller for breaking up forage into discrete elements and particles and for accelerating same toward the forage outlet of said first impeller, said forage outlet of said first impeller being tangential and disposed about a quarter of a circle downstream from the forage inlet of said first impeller and feeding directly into the forage inlet of said second impeller via said duct means in a second direction generally horizontal and transverse to the shaft of said second impeller, said forage inlet of said second impeller being a lateral opening through the housing of said second impeller adjacent the path of travel of the paddles thereof and being disposed about a quarter of a circle upstream from said tangential spout, said first and second impellers rotating in the same direction whereby accelerated forage elements and particles flowing through the forage outlet of said first impeller and through said duct means enter into said second impeller through the forage inlet thereof at an acute angle relative to the direction of travel of the paddles of said second impeller at that point, to be further accelerated in said second direction by the paddles of said second impeller upwardly toward said tangential spout, said housing of said second impeller comprises a planar wall which constitutes a partition between said duct means and said housing of said second impeller, wherein said duct means has a main portion which is of generally constant cross-section and which extends between the forage outlet of said first impeller and the forage inlet of said second impeller, said forage inlet of said second impeller being an opening through said planar wall, said duct means also comprising a vertical deflecting wall at the end of said duct means adjacent said opening for deflecting said forage into said second impeller via said opening, said deflecting wall making an acute angle with said opening and joining said planar wall at the distal edge of said opening.

2. A forage blower as defined in claim 1, wherein the said duct means is of generally constant rectangular cross-section.

* * * * *